(12) United States Patent
Destraves et al.

(10) Patent No.: US 11,264,698 B2
(45) Date of Patent: Mar. 1, 2022

(54) RADIO-FREQUENCY TRANSPONDER FOR TIRE

(71) Applicant: COMPAGNIE GENERALE DES ETABLISSEMENTS MICHELIN, Clermont-Ferrand (FR)

(72) Inventors: Julien Destraves, Clermont-Ferrand (FR); Thomas Caro, Clermont-Ferrand (FR); Jean-Mathieu Clergeat, Clermont-Ferrand (FR); Laurent Couturier, Clermont-Ferrand (FR); Guillaume Portier, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 17/043,812

(22) PCT Filed: Mar. 27, 2019

(86) PCT No.: PCT/FR2019/050706
§ 371 (c)(1),
(2) Date: Sep. 30, 2020

(87) PCT Pub. No.: WO2019/186066
PCT Pub. Date: Oct. 3, 2019

(65) Prior Publication Data
US 2021/0098858 A1    Apr. 1, 2021

(30) Foreign Application Priority Data
Mar. 30, 2018 (FR) .................................. 1852837

(51) Int. Cl.
*H01Q 1/22* (2006.01)
*H01Q 1/36* (2006.01)
(Continued)

(52) U.S. Cl.
CPC .......... *H01Q 1/2241* (2013.01); *B60C 19/00* (2013.01); *H01Q 1/362* (2013.01); *H01Q 9/16* (2013.01); *H04B 1/59* (2013.01)

(58) Field of Classification Search
CPC .......... H01Q 1/22; H01Q 1/2241; H01Q 1/36; H01Q 1/362; H01Q 9/06; H01Q 9/14;
(Continued)

(56) References Cited

U.S. PATENT DOCUMENTS

| 5,181,975 A | 1/1993 | Pollack et al. |
| 10,339,435 B2 | 7/2019 | Destraves |

(Continued)

FOREIGN PATENT DOCUMENTS

| DE | 10300160 A1 | 7/2004 |
| EP | 0505905 A1 | 9/1992 |

(Continued)

OTHER PUBLICATIONS

International Search Report dated May 17, 2019, in corresponding PCT/FR2019/050706 (5 pages).

*Primary Examiner* — Blane J Jackson
(74) *Attorney, Agent, or Firm* — Venable LLP

(57) ABSTRACT

A passive radiofrequency transponder comprises a radiating dipole antenna consisting of a single-strand helical spring having an axis, a median plane, a pitch and a diameter for a given wire diameter, and an electronic portion located inside the radiating antenna. The electronic portion comprises an electronic chip electrically connected to a primary antenna that is electromagnetically coupled to the radiating antenna. The primary antenna has an axis parallel to the axis of the radiating antenna and a median plane superposed with the median plane of the radiating antenna. The primary antenna is circumscribed by a cylinder the diameter of which is larger than one third of the inside diameter of the radiating (Continued)

antenna. The radiofrequency transponder is characterized in that, in a first region of the radiating antenna, in which the latter is not located plumb with the electronic portion, the first helix pitch of the radiating antenna is larger than the second helix pitch of the radiating antenna that does not form part of this first region.

19 Claims, 5 Drawing Sheets

(51) Int. Cl.
  *B60C 19/00* (2006.01)
  *H04B 1/59* (2006.01)
  *H01Q 9/16* (2006.01)

(58) Field of Classification Search
  CPC .. H01Q 9/16; H04B 1/59; B60C 19/00; B60C 2019/004
  See application file for complete search history.

(56) References Cited

U.S. PATENT DOCUMENTS

| | | | |
|---|---|---|---|
| 10,974,553 | B2 | 4/2021 | Destraves et al. |
| 11,018,406 | B2 | 5/2021 | Destraves et al. |
| 2006/0049928 | A1* | 3/2006 | Ening ................. H04B 5/00 340/448 |
| 2007/0279202 | A1* | 12/2007 | Lionetti ............ B60C 23/0493 340/447 |
| 2008/0158072 | A1* | 7/2008 | Logan ................. H01Q 1/2208 343/711 |
| 2011/0032174 | A1 | 2/2011 | Sinnett et al. |
| 2013/0299597 | A1 | 11/2013 | Sinnett et al. |
| 2014/0368327 | A1* | 12/2014 | Darrer ............... B60C 23/0433 340/447 |
| 2017/0174014 | A1* | 6/2017 | Stewart ............. B60C 23/0493 |
| 2018/0174015 | A1 | 6/2018 | Destraves |
| 2018/0264898 | A1 | 9/2018 | Lallement et al. |
| 2019/0341673 | A1 | 11/2019 | Destraves et al. |
| 2020/0062050 | A1 | 2/2020 | Destraves et al. |
| 2020/0070598 | A1 | 3/2020 | Noel et al. |
| 2021/0019590 | A1 | 1/2021 | Destraves et al. |
| 2021/0023885 | A1 | 1/2021 | Sams |

FOREIGN PATENT DOCUMENTS

| | | |
|---|---|---|
| WO | 2009/134243 A1 | 11/2009 |
| WO | 2016/193457 A1 | 12/2016 |
| WO | 2017/046245 A1 | 3/2017 |

* cited by examiner

| TELECOMMUNICATIONS | ELECTRONICS |
|---|---|
| PRODUCING THE PRIMARY PORTION OF THE RADIATING ANTENNA | CONNECTING ELECTRONIC CHIP TO PRINTED CIRCUIT BOARD |
| | PRODUCING THE PRIMARY ANTENNA |
| | CONNECTING PRIMARY ANTENNA TO CIRCUIT BOARD |
| | ELECTRONIC PORTION: ENCAPSULATING CIRCUIT BOARD IN A STIFF AND INSULATING MATERIAL |

*ASSEMBLY*

INSTALLING ELECTRONIC PORTION IN THE FIRST PORTION OF THE RADIATING ANTENNA

PRODUCING THE SECONDARY PORTION OF THE RADIATING ANTENNA: OBTAINING RADIOFREQUENCY TRANSPONDER

PRODUCING IDENTIFICATION TAG: INSERTING RADIOFREQUENCY TRANSPONDER INTO AN INSULATING AND SUPPLE ELASTOMER

FIG. 7

RADIO-FREQUENCY TRANSPONDER FOR TIRE

FIELD OF THE INVENTION

The present invention relates to an electronic radio-identification device or radiofrequency transponder able to be fastened to an object to be identified that, in particular in service, is subjected to high thermal-mechanical stresses, such as a tyre.

TECHNOLOGICAL BACKGROUND

In the field of RFID devices (RFID being the acronym of RadioFrequency IDentification), passive radiofrequency transponders are conventionally used to identify, track and manage objects. These devices allow more reliable and faster automated management.

These radiofrequency-identification transponders generally consist of at least one electronic chip and one antenna formed by a magnetic loop or a radiating antenna, which is fastened to the object to be identified.

The communication performance of the radiofrequency transponder is expressed in terms of the maximum distance of communication of the radiofrequency transponder with a radiofrequency reader, for a given signal communicated to or by the radiofrequency reader.

In the case of highly extensible products such as, for example, tyres, there is a need to identify the product throughout its life from its manufacture to its removal from the market and, in particular, during use thereof. Thus, in order to facilitate this task, in particular under the conditions of use, a high communication performance is required, which is expressed in terms of the ability to interrogate the radiofrequency transponder at a large distance (several meters) from the product, via a radiofrequency reader. Lastly, it is desired for the manufacturing cost of such a device to be as competitive as possible.

A radiofrequency transponder able to meet the needs of tyres is known in the prior art, and in particular from document WO 2016/193457A1. This transponder consists of an electronic chip, connected to a printed circuit board to which is electrically connected a first primary antenna. This primary antenna is electromagnetically coupled to a single-strand helical spring that forms a radiating dipole antenna. The communication with an external radiofrequency-transmitting reader uses radiowaves and in particular the UHF band (UHF being the acronym of Ultra-High Frequency). Therefore, the characteristics of the helical spring are adjusted for the chosen communication frequency. Thus, the disappearance of the mechanical junction between the printed circuit board and the radiating antenna improves the mechanical resistance of the radiofrequency transponder.

However, such a radiofrequency transponder has weaknesses. Although this radiofrequency transponder is suitable for operating at the communication frequency of the external radiofrequency reader, the radiofrequency communication and in particular the electromagnetic coupling between the radiating antenna and the primary antenna is not optimal, either in radiofrequency reception or in radiofrequency transmission. Of course, it is also necessary to take into account the other technical constraints that the various elements of the radiofrequency transponder must meet. On the one hand, the mechanical resistance of the radiating antenna in an environment that is highly thermomechanically stressed such as a tyre casing. On the other hand, the electromagnetic characteristics that the radiating antenna must have to perform this communication function. Thus, it is necessary to optimize the compromise in performance between the mechanical resistance of the antenna, its electromagnetic qualities and its radiocommunication efficacy in order to optimize the potential performance of such a radiofrequency transponder.

The present invention relates to a radiofrequency transponder aiming to improve the performance compromise of the radiofrequency transponders employed, inter alfa, in the tyre industry.

DESCRIPTION OF THE INVENTION

The invention relates to a passive radiofrequency transponder intended to be integrated into an object to be identified made of a highly extensible material such an elastomer composition or blend. This radiofrequency transponder firstly comprises a radiating dipole antenna. The latter consists of a single-strand helical spring and has an axis of revolution, a winding diameter, a helix pitch, a median plane and a wire diameter defining inside and outside diameters of the radiating antenna. This radiating antenna has a length L0 suitable for communication in a frequency band with a radiofrequency-transmitting reader. This radiofrequency transponder also comprises an electronic portion located inside the radiating antenna. This electronic portion comprises an electronic chip and a primary antenna electrically connected to the electronic chip and electromagnetically coupled to the radiating antenna. The primary antenna firstly has an axis substantially parallel to the axis of revolution of the radiating antenna and a median plane, which is substantially superposed with the median plane of the radiating antenna. Lastly, the primary antenna is circumscribed by a cylinder the axis of revolution of which is parallel to the axis of the primary antenna and the diameter of which is larger than or equal to one third of the inside diameter of the radiating antenna. This radiofrequency transponder is characterized in that, in a first region of the radiating antenna, in which the radiating antenna is not located plumb with the electronic portion, a first pitch of the radiating antenna corresponding to the helix pitch of the radiating antenna in this first region is larger than the second pitch of the radiating antenna corresponding to the helix pitch of the radiating antenna in a second region in which the radiating antenna is located plumb with the electronic portion.

Here, the term "elastomer" is understood to mean all the elastomers including TPEs (acronym of ThermoPlastic Elastomers), such as for example diene polymers, i.e. polymers comprising diene units, silicones, polyurethanes and polyolefins.

Here, the term "electromagnetic coupling" is understood to mean coupling via electromagnetic radiation, i.e. the transfer without physical contact of energy between two systems including, on the one hand, inductive coupling and, on the other hand, capacitive coupling. The primary antenna is the preferably comprised in the group comprising: a coil, a loop or a wire segment or a combination of these conductive elements.

Thus, the absence of any mechanical connection between the radiating antenna and the electronic chip substantially improves the performance in terms of endurance of the radiofrequency transponder according to one subject of the invention relative to the radiofrequency transponder of the aforementioned document.

In addition, the radiating antenna, since it is not connected to any circuit board, may be embedded in and integrated with a mass made of elastomer blends using elastomer/metal adhesive-bonding solutions that are well known to those skilled in the art, with or without use of a specific adhesion promoter. This decreases, at the same time, the cost of implementing such a radiofrequency transponder in a rubber mass such as a tyre.

Lastly, having separated the electronic portion of the radiofrequency transponder (which consists of the circuit board and of the primary antenna) and the radiating antenna, it is possible to produce each component independently then assemble them together in a subsequent step. Thus, it is possible to use processes that are standard in each industry (electronics industry and telecommunications industry), this decreasing the cost of manufacture of such a radiofrequency transponder. Here, the term "elastomer" is understood to mean all the elastomers including TPEs (acronym of ThermoPlastic Elastomers), such as for example diene polymers, i.e. polymers comprising diene units, silicones, polyurethanes and polyolefins.

Here, the term "substantially parallel" is understood to mean that the angle generated by the axial directions of each antenna is smaller than or equal to 30 degrees. In this case, the electromagnetic coupling between the two antennas is optimal, notably improving the communication performance of the radiofrequency transponder.

Here, the median plane of the primary and radiating antennas should first be defined. By definition, it is a fictional plane separating the object into two equal portions. In our case, this median plane is perpendicular to the axis of each antenna. Lastly, what is meant here by "substantially superposed" is that the relative distance between the median planes is smaller than one tenth of the length of the radiating antenna.

Thus, since the electrical current is of maximum magnitude at the centre of the radiating antenna, the magnetic field induced by this current is also maximum at the centre of the radiating antenna, and thus it is ensured that the inductive coupling between the two antennas is optimal, thereby improving the communication performance of the radiofrequency transponder.

By defining the relative dimensions of the primary antenna with respect to the characteristics of the helical spring of the radiating antenna, it is ensured that the distance between the two antennas will be smaller than the diameter of the primary antenna in the case where the primary antenna is located inside the radiating antenna. Thus, the inductive coupling between the two antennas and therefore the communication performance of the radiofrequency transponder are optimized in transmission and reception.

Likewise, by defining the helix pitch of the radiating antenna in a second region in which the radiating antenna is located plumb with the electronic portion to be smaller than the pitch of the radiating antenna outside this region, the electromagnetic aptitudes of the radiating antenna in this region are favoured to the detriment of its radiating efficacy, which is promoted in the first region of the radiating antenna. Thus, the compression of the helix pitch of the radiating antenna improves the inductance of the radiating antenna in this region. For a given flow of electrical current through the radiating antenna, this is a lever that is essential to increase the magnetic field generated by the radiating antenna. Furthermore, this improvement in the inductance of the radiating antenna is obtained without necessarily modifying the winding diameter of the radiating antenna. In addition, for an antenna of given length, the compression of the radiating antenna plumb with the primary antenna of the electronic portion ensures a larger area of exchange between the two antennas, thus improving the electromagnetic coupling between the two antennas and therefore the communication performance of the radiofrequency transponder. Lastly, the compression of the pitch of the radiating antenna allows the manufacturing tolerances of the radiating antenna to be minimized and better controlled in this second region, in particular as regards the definition of the inside diameter of the radiating antenna. Thus, the scrap rate of the radiating antennas is improved since whether or not the electronic portion can be positioned within the radiating antenna is dependent on the control of this diameter.

Preferably, the second helix pitch of the radiating antenna is constant or continuously variable although solutions of piecewise variable or simply variable type may also be envisaged. In these secondary solutions, it is preferable but not indispensable for the variations to be of small amplitude from a first piece to the contiguous piece.

This makes it possible to ensure, in the second region of the radiating antenna and from a mechanical point of view, the absence of any singular points that would impact the physical integrity of the radiating antenna.

According to another advantageous embodiment, the minimum distance between the cylinder circumscribed about the primary antenna and the radiating antenna is smaller than 15% of half the inside diameter of the radiating antenna.

Thus, a certain proximity is ensured, at least pointwise, between the radiating antenna and the primary antenna, allowing the exchange of energy between the two antennas during the electromagnetic coupling to be substantially improved. The better control of the manufacture of the helical spring permits the antennas to be brought closer together, without modifying the scrap rate of the radiofrequency transponders.

According to one specific embodiment, the axis of the cylinder circumscribed about the primary antenna is parallel to the axis of revolution of the radiating antenna.

According to one very specific embodiment, the diameter of the cylinder circumscribed about the primary antenna is larger than or equal to 75% of the inside diameter of the radiating antenna plumb with the electronic portion, and preferably larger than or equal to 80%.

With this type of design, it is ensured that a plurality of points of the primary antenna are at equal distance from the radiating antenna. Thus, the efficacy of the electromagnetic coupling between the two antennas is further improved by providing a larger area of exchange between the two antennas, for a given flow of electrical current through either of the antennas. Of course, the points of exchange between the two antennas will be correspondingly multiplied if the latter have the same loop geometry, in particular a circle. Because the manufacturing tolerances of the radiating antenna are controlled plumb with the electronic portion of compressed pitch, it is possible to reproducibly and reliably achieve low scrap rates for the radiofrequency transponders while ensuring a proximity between the two antennas right the way around the axis of revolution of the radiating antenna. This proximity is a factor that is key to the communication performance of the radiofrequency transponder. Of course, if the two antennas are coaxial, performance is further improved.

Preferably, the primary antenna being connected to the terminals of a circuit board comprising the electronic chip, the electrical impedance of the primary antenna is matched to the electrical impedance of the circuit board of the radiofrequency transponder.

The term "electrical impedance of the circuit board" is understood to mean the electrical impedance across those terminals of the circuit board that are connected to the primary antenna, this representing the electrical impedance of the circuit board comprising at least one electronic chip and a printed circuit board to which the electronic chip is connected.

By matching the impedance of the primary antenna to that of the circuit board, the radiofrequency transponder is optimized at the communication frequency by improving the gain and achieving a circuit board of more selective form factor and narrower passband. Thus, the communication performance of the radiofrequency transponder is improved for a given amount of energy transmitted to the radiofrequency transponder. This in particular results in an increase in the read distance of the radiofrequency transponder. The impedance match of the primary antenna is obtained by adjusting at least one of the geometric features of the primary antenna, such as, for example, the diameter of the wire, the material of this wire and the length of the wire.

The impedance match of the primary antenna may thus be obtained by adding an impedance-matching circuit made up of additional electronic components between the primary antenna and the electronic circuit, such as, for example, filters based on an inductor, capacitors and transmission lines.

The impedance match of the primary antenna may also be obtained by combining features of the primary antenna and features of an impedance-matching circuit.

According to one preferred embodiment, the primary antenna being a coil of a number of turns, the number of turns is a real number comprised between 5 and 30, and preferably comprised between 5 and 25.

According to another preferred embodiment, the impedance match of the circuit board is achieved via at least one additional electronic circuit positioned on the circuit board, the additional electronic circuit preferably being a galvanic circuit of meander shape.

Because of the nature of the circuit board, and in particular of the electronic chip, the number of turns, depending on the turn diameter, the pitch, the diameter of the wire and the geometric shape of the turn, is chosen to bring the electrical impedance of the primary antenna closer to that of the circuit board. In certain cases in which the coil is obtained by continuously winding a conductive wire, it is possible to define a non-integer number of turns in order to perfectly match the impedance of the primary antenna. If the number of turns of the coil is, by the design of the antenna, an integer number or if it is desired to match the antenna to a plurality of types of electronic chip, it is useful to provide an additional electronic circuit in order to perfectly match the impedance of the antenna to that of the circuit board. In this case, a simple galvanic circuit is sometimes sufficient to erase the impedance delta caused by the integer number of turns of the coil. In order to minimize the volume occupied by this additional circuit, a structure of meander shape on the printed circuit board of the circuit board is the best way to achieve a compromise that minimizes the space taken up and allows a fine match to be achieved by adjusting the curvilinear length of the galvanic circuit.

According to one particular embodiment, the electronic chip and at least one portion of the primary antenna are embedded in a stiff and electrically insulating material, such as, for example, high-temperature epoxy resin. This assembly forms the electronic portion of the radiofrequency transponder.

Thus, the electronic portion comprising at least one portion of the primary antenna and the electronic chip connected to the printed circuit board is stiffened, making the mechanical connections between the components thereof more reliable with respect to the thermomechanical stresses to which the object to be identified is subjected.

This also allows the electronic portion of the radiofrequency transponder to be manufactured independently of the radiating antenna or of the object to be identified. In particular, for example, using a micro-coil of a number of turns as primary antenna allows miniaturization of the electronic component comprising the primary antenna and the electronic chip to be envisaged.

According to another embodiment, the portion of the primary antenna not embedded in the stiff mass is coated with an electrically insulating material.

Thus, if the primary antenna is not entirely contained in the stiff and electrically insulating mass of the electronic portion, it is useful to insulate it via a coating made of an electrically insulating material, such as those employed for the insulating sheaths of electrical cables.

Advantageously, the ratio between the helix pitch and the winding diameter for at least one loop of the radiating antenna located in the first region of the radiating antenna is higher than 0.8.

Specifically, outside of the region of the radiating antenna that is located plumb with the electronic portion and therefore with the primary antenna, a ratio of the helix pitch to the winding diameter higher than 0.8 for a loop of the radiating antenna has the advantageous effect of stretching the helical spring. Thus, the length of wire needed to make a nominal span of radiating antenna is decreased. Thus, the resistance of the radiating antenna is decreased. Therefore, for a given electric field, the electrical current flowing through the radiating antenna is of higher magnitude at the natural frequency of the radiating antenna, this allowing the communication performance of the radiofrequency transponder to be improved. In addition, stretching the helical spring allows the efficiency of the radiating antenna to be improved by improving the ratio between the radiation resistance and loss resistance. This stretching also allows, for a given flow of electrical current through the radiating antenna, the electric field radiated by the radiating antenna to be maximized. Lastly, for radiating antenna of given pitch, stretching the radiating antenna allows the volume occupied by the helical spring to be decreased. Thus, in a constrained dimensional environment, such as the thickness of a tyre casing, it is possible to increase the thickness of insulating rubber surrounding the radiating antenna in the first region thereof. This electrical insulation minimizes losses and therefore improves the communication performance of the radiofrequency transponder, both in transmission and in reception. Of course, it is ideal for each of the loops of the helical spring of the first region of the radiating antenna to be elongate, this correspondingly improving the communication performance of the radiofrequency transponder.

Preferably, the ratio between the helix pitch and the winding diameter of each of the loops of the spring in the first region of the radiating antenna is lower than 3, and preferably lower than 2.

Although it is advantageous to improve the radioelectric performance of the radiating antenna, it is necessary to also not neglect the other functions that it must perform. In particular, the helical spring is a supple structure suitable for bearing the three-dimensional stresses to which the radiofrequency transponder will necessarily be subjected in its application of identification of an object. Thus, it is recommended to limit the amount by which the radiating antenna is stretched in this first region in order to ensure the radiating antenna preserves a sufficient suppleness on the whole and thus to ensure the physical integrity of the radiofrequency antenna.

According to one particular embodiment, at least one turn of the two last loops of the helical spring in the first region of the radiating antenna, i.e. the two loops that are located axially outermost with respect to the electronic portion, adjoin.

This then avoids the radiating antennas of the radiofrequency transponders from becoming interlaced during the process of manufacture of the latter. Thus, the handling of the radio-frequency transponders is facilitated, allowing the cost price of the radiofrequency transponders to be optimized. The fact of limiting this effect to the loops located axially outermost with respect to the electronic portion affects only slightly the radioelectric performance of the radiating antenna.

According to one preferred embodiment, in the second region of the radiating antenna in which the radiating antenna is located plumb with the electronic portion, the ratio between the helix pitch and the winding diameter for each loop of the radiating antenna is lower than or equal to 0.8.

Specifically, in this second region of the radiating antenna, and more particularly in the region located plumb with the primary antenna, the effect expected from the radiating antenna is electromagnetic, and in particular inductive, coupling with the primary antenna of the electronic portion. Thus, a first lever for improving this coupling is to increase the inductance of the radiating antenna in this second region, this amounting to contracting the helical spring. In addition, contracting the radiating antenna in this second region also promotes the transfer of energy between the primary antenna and the radiating antenna by increasing, for a given length of the primary antenna located facing the radiating antenna, the area of exchange furnished by the radiating antenna. This improvement in energy transfer leads to a better communication performance being obtained from the radiofrequency transponder.

Preferably, a first inside diameter of the radiating antenna corresponding to the inside diameter of the radiating antenna in the first region is smaller than a second inside diameter of the radiating antenna corresponding to the inside diameter of the radiating antenna in a second region different from the first region and the electronic portion is circumscribed by a cylinder the axis of revolution of which is parallel to the axis of revolution of the radiating antenna and the diameter of which is larger than or equal to the first inside diameter of the radiating antenna.

By ensuring that the cylinder that circumscribes the electronic portion has an axis of revolution parallel to the axis of revolution of the radiating antenna and a diameter larger than or equal to the first inside diameter of the radiating antenna, the first region of the radiating antenna therefore forms a stop with respect to the axial movement of the electronic portion. The fact that this first region is located on either side of the region of the radiating antenna located plumb with the electronic portion, because of the centred position of the electronic portion with respect to the radiating antenna, ensures that two mechanical stops axially located externally to the electronic portion are then provided, limiting any axial movement of the electronic portion of the radiofrequency transponder. In addition, since the diameter of the cylinder circumscribing the electronic portion is located inside the radiating antenna in the second region, this diameter is necessarily smaller than the second inside diameter of the radiating antenna. Thus, the radial movement of the electronic portion is limited by the second inside diameter of the radiating antenna. In conclusion, the movement of the electronic portion is limited, this allowing the communication performance of the radiofrequency transponder to be ensured while ensuring a physical integrity of the electronic portion and of the radiating antenna of the radiofrequency transponder. Lastly, the endurance of the object accommodating this radiofrequency transponder is also not impacted by this choice of design. The handling of the radiofrequency transponders is facilitated thereby, without any need for additional precautions.

According to one specific embodiment, the communication with the radiofrequency-transmitting reader occurs in the UHF band and most specifically in the range comprised between 860 and 960 MHz.

Specifically, in this frequency band, the length of the radiating antenna is inversely proportional to the communication frequency. Furthermore, outside of these frequency bands, radioelectric communication is highly perturbed or even impossible through elastomeric materials. Thus, this is the best compromise between the size of the radiofrequency transponder and its radioelectric communication, in particular in the far-field, allowing communication distances that are satisfactory for the tyre industry to be obtained.

According to another particular embodiment, the length L0 of the radiating antenna is comprised between 30 and 50 millimetres.

Specifically, in the frequency range between 860 and 960 MHz and depending on the relative dielectric permittivities of the elastomer blends surrounding the radiofrequency transponder, the wavelength of the radioelectric waves transmitted or received by the radiofrequency transponder is located in the interval between 30 and 50 millimetres. In order to optimize the operation of the radiating antenna at these wavelengths, it is perfectly recommended to tailor the length of the radiating antenna to the resonant frequency of the radiating antenna.

Advantageously, the winding diameter of the radiating antenna in the first region is comprised between 0.6 and 2.0 millimetres, and preferably between 0.6 and 1.6 millimetres.

This allows the volume occupied by the radiating antenna to be limited and therefore the thickness of electrically insulating elastomer blend around the radiofrequency transponder to be increased. Of course, this winding diameter of the radiating antenna in the first region may be constant, variable, continually variable or piecewise variable. It is preferable from a point of view of the mechanical integrity of the radiating antenna for the diameter to be constant or continuously variable.

Advantageously, the winding diameter of the radiating antenna in the second region is comprised between 1.4 and 2.0 millimetres, and preferably between 1.4 and 8 millimetres.

This dimension of the diameter of the second region of the radiating antenna allows the electronic portion and in particular a coil the cylinder of which circumscribes a certain diameter to be accommodated. This allows the axial dimension of the cylinder circumscribing the electronic portion to be limited with a view to matching the impedance of the primary antenna to that of the circuit board of the electronic portion. In addition, in a constrained environment such as a tyre casing, minimizing the dimensions of the radiofrequency transponder allows the thickness of the elastomer blends surrounding it to be increased. These blends may be electrically insulating in order to improve the radioelectric performance of the radiofrequency transponder.

According to one preferred embodiment, the helix pitch of at least one loop of the radiating antenna in the first region of the radiating antenna is comprised between 1 and 4 millimetres.

This makes it possible to ensure that the ratio of the helix pitch to the winding diameter of the helical spring in the first region of the radiating antenna is lower than 3, guaranteeing a minimum of elongation of the helical spring. In addition, this helix pitch may also be constant or variable throughout the first region of the radiating antenna. Of course, it is preferable for the helix pitch to be continuously variable or variable with small transitions in variation in order to avoid singular points in the radiating antenna that would form mechanical weaknesses in the radiating antenna.

Preferably, the pitch of the radiating antenna in the second region of the radiating antenna is smaller than 1.5 millimetres.

This makes it possible to ensure that the ratio between the helix pitch and the winding diameter of the radiating antenna in this second region is smaller than or equal to 0.8, enhancing the electromagnetic characteristics of the radiating antenna instead of its radioelectric characteristics.

According to one advantageous embodiment, the diameter of the wire of the radiating antenna is comprised between 0.05 and 0.25 millimetres, and ideally between 0.12 and 0.22 millimetres.

In this wire range loss resistance is certain to be low, thus improving the radioelectric performance of the radiating antenna. In addition, limiting the diameter of the wire allows the distance between the radiating antenna and the electrical conductors to be increased by increasing the thickness of the electrically insulating elastomer blends. However, it is necessary for the wire to preserve a certain strength in order to be able to bear the thermomechanical stresses that it will undergo in a highly stressed environment such as a tyre casing, without optimizing the breaking stress of the material of these wires, which is generally mild steel. This makes it possible to ensure the radiating antenna represents a satisfactory technical/economical compromise.

Another subject of the invention is an identification tag consisting of a radiofrequency transponder embedded in a supple and electrically insulating mass of elastomer blends.

The term electrically insulating is understood here to mean that the electrical conductivity of the elastomer blend is below the conductive charge transfer threshold of the blend.

Thus, an identification tag that facilitates the installation of the radiofrequency transponder in objects to be identified, which comprise portions made of material based on elastomer blend, is formed. A conventional bonding-rubber layer will possibly be employed if necessary, to secure the identification tag to the object, such as a tyre, to be identified.

In addition, the stiffness and electrical-conductivity characteristics of the elastomer blend ensure a quality mechanical insertion and electrical insulation of the radiofrequency transponder within the components of the object to be identified. Thus, the operation of the radiofrequency transponder is not perturbed by the object to be identified.

Another subject of the invention is a process for manufacturing the radiofrequency transponder, which comprises the following steps:
  an electronic chip is electrically connected to a printed circuit board in order to form a circuit board;
  a coil defining a primary antenna is produced using a conductive wire;
  the primary antenna is electrically connected to the circuit board;
  at least one portion of the primary antenna and the circuit board are embedded in a stiff and electrically insulating mass such as a heat-curable resin, in order to form the electronic portion of the radiofrequency transponder;
  a primary portion of a radiating antenna of length L0 and of axis of revolution U consisting of a helical spring is produced, according to one specific embodiment starting with the loop located outermost with respect to the median plane of the radiating antenna, this portion comprising the first half of the first region of the radiating antenna and at least a first portion of the second region of the radiating antenna;
  the electronic portion of the radiofrequency transponder is positioned axially and radially with respect to the primary portion of the radiating antenna, according to one specific embodiment by placing the electronic portion in abutment against the loop of the first region of the radiating antenna which is located innermost with respect to the median plane of the radiating antenna, in such a way that the primary antenna of the electronic portion is circumscribed by a cylinder having an axis and a median plane that is perpendicular thereto, the axis of the primary antenna and the axis of revolution U of the radiating antenna being substantially parallel and the median plane of the primary antenna being substantially centred with respect to the middle of the length L0 of the radiating antenna;
  the secondary portion of the radiating antenna is finalized, advantageously starting with the second portion of the second region of the radiating antenna, this secondary portion comprising at least the second half of the first region of the radiating antenna.

Thus, manufacture of the radiofrequency transponder is simplified by producing the electronic portion and the radiating antenna of the radiofrequency transponder separately. In addition, the step of assembling the two components requires no mechanical or electrical connection between the two components, this drastically decreasing the cost of manufacture of the radiofrequency transponder.

The step of producing the radiating antenna is performed in three stages. Between two stages of production of the radiating antenna, the previously produced electronic portion is positioned with respect to the primary portion of the radiating antenna produced. Next, the secondary portion of the antenna is produced in the presence of the electronic portion. This process is easily automatable.

The invention also relates to another process for manufacturing the radiofrequency transponder, which comprises the following steps:
  an electronic chip is electrically connected to a printed circuit board in order to form a circuit board;
  a coil forming a primary antenna is produced using a conductive wire;
  the primary antenna is electrically connected to the circuit board;
  at least one portion of the primary antenna and the circuit board are embedded in a stiff and electrically insulating mass such as a heat-curable resin, in order to form the electronic portion of the radiofrequency transponder;
  a radiating antenna of length L0 and of axis of revolution U consisting of a helical spring comprising a second region, defined by a helix pitch P2 and a winding diameter D2, is produced between two portions of a first region of the radiating antenna, which region is defined by a helix pitch P1 and a winding diameter D1;

a region, comprising at least one turn of the helical spring, of transition between one portion of the first region and the second region of the radiating antenna is identified using means, for example optical means or mechanical or magnetic distance sensors, for detecting the variation in the winding diameter and/or the variation in the helix pitch;

a bending point located in the turn of the region of transition is identified, this point preferably being located in the half of the turn that is located closest to the second region of the radiating antenna;

the helical spring is bent by a first angle, which is preferably comprised between 70 and 110°, about an axis perpendicular to the axis of revolution U passing through the bending point between the portions of the helical spring that are located upstream and downstream of the bending point, in order to create an opening in the upstream portion of the helical spring, which comprises the second region of the radiating antenna, the inscribed diameter of which is larger than or equal to the diameter of the cylinder circumscribing the electronic portion;

the electronic portion is inserted into the upstream portion of the helical spring via the opening, so that that axial end of the cylinder circumscribing the electronic portion which is located outermost with respect to the upstream portion of the helical spring is located at a distance smaller than the helix pitch P2 above a plane the normal of which is the axis of revolution of the upstream portion passing through the bending point;

the helical spring is bent again at the bending point by a second angle opposite to the first angle about the axis perpendicular to the axis of revolution of the upstream portion of the helical spring passing through the bending point and the amplitude of which is at least equal to or larger than the amplitude of the first angle, so that the axes of revolution of the upstream and downstream portions of the helical spring are collinear.

This second embodiment allows the step of producing the helical spring forming the radiating antenna to be dissociated from the step of assembling the electronic portion with the radiating antenna, this allowing the industrial manufacturing yield of the helical spring to be optimized. The assembly may thus be carried out at a dedicated station.

Depending on the nature of the metal from which the helical spring is made and on its elasto-plastic properties, it is recommended to choose the second bending angle so that the two portions located upstream and downstream of the bending point are collinear after the second time the helical spring is bent, in order to ensure the helical spring of axis of revolution U is reformed. The two axes of revolution of the upstream and downstream portions are aligned to within acceptable tolerance limits, so that the radiofrequency of the operation of the radiating antenna is not disrupted, this corresponding to an angle between the axes of revolution of the upstream and downstream portion of the helical spring smaller than 20°.

The potential localized increase in the plasticity of the helical spring in proximity to the bending point does not adversely affect the mechanical behaviour of the helical spring, which by nature has a large range of movement. This region must not in principle remain outside the domain of plasticity of the material of the helical spring.

The location of the bending point, in the transition region, in proximity to the second region of the radiating antenna, makes it possible to ensure a centrality and a coaxiality of the electronic portion with respect to the second region of the helical spring, this being favourable to achieving correct electromagnetic operation between the primary and radiating antennas.

In addition, whatever the manufacturing process, at the manufacturing station where the springs are wound, it is easy to modify both the helix pitch and the winding diameter of the helical spring of each loop using, for steel wires, a given wire of diameter comprised between 0.05 and 0.25 millimetres, and preferably of diameter comprised between 0.11 and 0.22 millimetres, whether the wire is coated or not.

According to one particular embodiment, any one of the processes according to the invention also comprises a step of coating the primary antenna portion that is not embedded into the stiff and electrically insulating mass of an electrically insulating material.

This feature is useful as it allows a quality electromagnetic coupling to be obtained between the radiating antenna and the primary antenna while preventing any physical contact between the conductive portions of the two antennas.

Preferably, any one of the manufacturing processes according to the invention comprises a step of adding an additional electronic circuit comprising inductive and/or capacitive elements to the circuit board, and ideally a galvanic circuit of meander shape in order to match the electrical impedance of the primary antenna to the electrical impedance of the circuit board.

This allows the efficacy of the primary antenna to be improved. In the case where the way in which the primary antenna is produced allows the electrical impedance of the antenna to be better but imperfectly matched to that of the circuit board, it is possible to add a circuit board, which may simply be galvanic, to the circuit board in order to electrically match the impedances of the two components perfectly.

Another subject of the invention is a process for manufacturing the identification tag, in which a radiofrequency transponder is incorporated into a mass of at least one supple and electrically insulating elastomer blend using an injection-moulding, compression-moulding or extrusion process.

Thus, whatever the, green or cured, state of the elastomer, it is easy to incorporate the identification tag into an object to be identified, such as a tyre, comprising elastomer products using, where necessary, conventional elastomer/elastomer adhesion techniques. This incorporation may take place either during the phase of manufacture of the object, in which case the tag is for example incorporated into a green unfinished tyre, in particular before the elastomers are cured or vulcanized, or during a subsequent step of the process for manufacturing the object to be identified, in which case the tag is for example placed directly on an internal or external face of the tyre.

BRIEF DESCRIPTION OF THE DRAWINGS

The invention will be better understood on reading the following description, which relates to the case of application to pneumatic tyres. This application is given solely by way of example and with reference to the appended figures, throughout which the same reference numerals denote identical parts, and in which:

FIG. 7 is an overview of a process for manufacturing an identification tag comprising a radiofrequency transponder according to the invention.

DETAILED DESCRIPTION OF EMBODIMENTS

Below, the terms "tyre" and "pneumatic tyre" are employed equivalently and refer to any type of pneumatic or non-pneumatic tyre.

Figure 1:
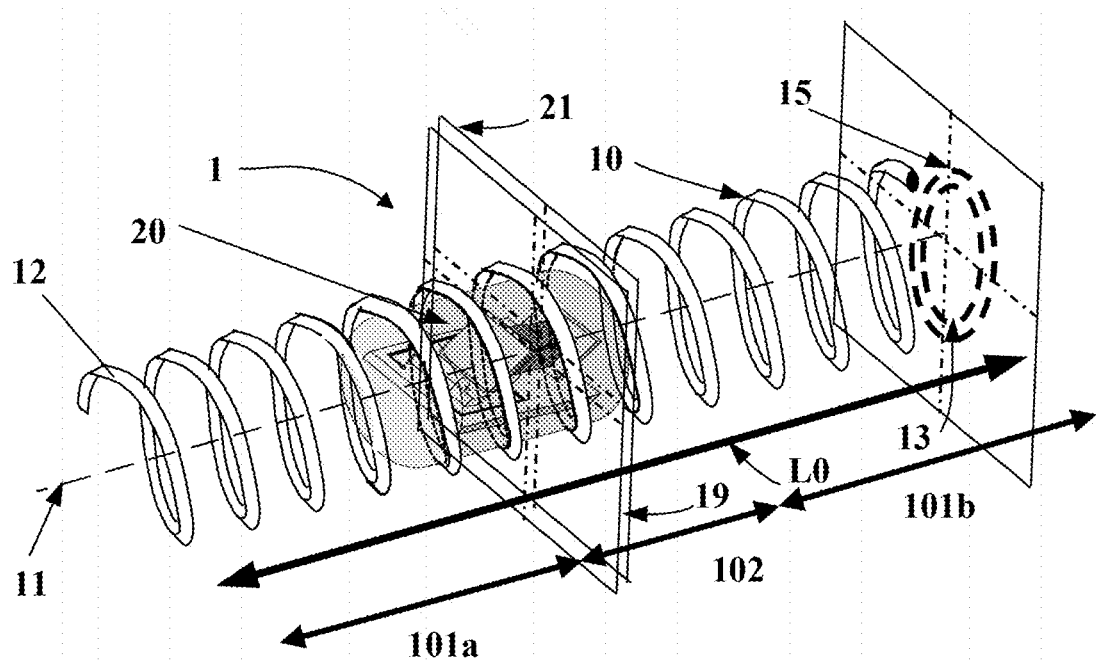
FIG. 1 shows a perspective view of a prior-art radiofrequency transponder in a configuration in which the electronic portion is located inside the radiating antenna.

FIG. 1 shows a prior-art radiofrequency transponder 1 in a configuration in which the electronic portion 20 is located inside the radiating antenna 10. The radiating antenna 10 consists of a steel wire 12 that has been plastically deformed in order to form a helical spring having an axis of revolution 11. The helical spring is primarily defined by a winding diameter of the coated wire and by a helix pitch. These two geometric parameters of the helical spring are here constant. Thus, given the diameter of the wire, inside and outside diameters 13, 15 of the helical spring are precisely defined. The length L0 of the spring here corresponds to one half-wavelength of the transmission signal of the radiofrequency transponder 1 in a mass of elastomer blend. It is therefore possible to define a median plane 19 of the helical spring, this plane lying perpendicular to the axis of revolution 11 and separating the radiating antenna 10 into two equal portions. The geometric shape of the electronic portion 20 is circumscribed by a cylinder the diameter of which is smaller than or equal to the inside diameter 13 of the helical spring. Insertion of the electronic portion 20 into the radiating antenna 10 is facilitated thereby. The median plane 21 of the primary antenna is located substantially superposed with the median plane 19 of the radiating antenna 10. Lastly, the axis of the primary antenna is substantially parallel to the axis of revolution 11 of the radiating antenna 10. It is possible to divide the radiating antenna into two distinct regions. The first region 101 of the radiating antenna 10, in which the helical spring is not located plumb with the electronic portion 20. This first region 101 of the radiating antenna 10 comprises two portions 101a and 101b that are substantially equivalent, these portions flanking the second region 102 of the radiating antenna 10 axially.

Figure 2:
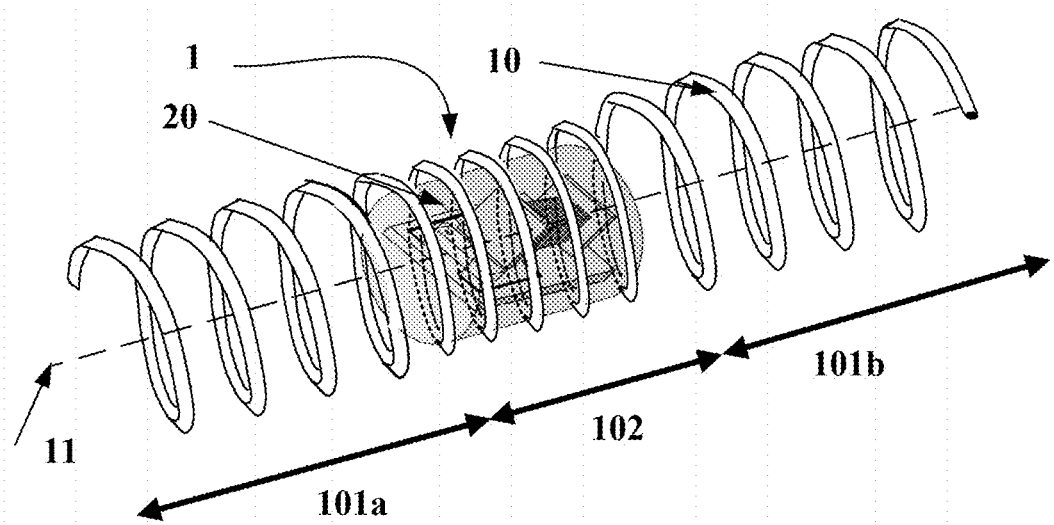
FIG. 2 shows a perspective view of a radiofrequency transponder according to the invention.

FIG. 2 shows a first radiofrequency transponder 1 according to the invention, the distinguishing feature of this transponder being, with respect to the prior-art radiofrequency transponder of FIG. 1, that the helix pitch of the second region 102 of the radiating antenna 10 is decreased by 20 percent with respect to the constant helix pitch of the radiating antenna of the prior-art radiofrequency antenna. In addition, in order not to modify the general form of the helical spring, the winding diameter of the second region 102 of the radiating antenna 10 has been modified to allow for the decrease in the helix pitch of the helical spring, so that the ratio of the helix pitch to the winding diameter remains constant with respect to the radiofrequency transponder of FIG. 1. This is achieved by decreasing by about 20 percent the winding diameter of the helical spring of FIG. 1. Thus, the radioelectric properties of the radiating antenna 10 are not affected by these modifications. However, the decrease in the winding diameter of the second region 102 of the radiating antenna 10 causes the distance between the radiating antenna 10 and the electronic portion 20 and therefore also the primary antenna to be decreased. This decrease in the distance between the antennas is possible because of the compression of the helix pitch of the radiating antenna 10. Specifically, this permits the manufacturing tolerances associated with the winding diameter to be decreased, allowing the antennas to be brought closer to each other without however impacting the cost of manufacture of the radiating antenna. In conclusion, this first embodiment of the invention emphasizes optimization of the transfer of electromagnetic energy between the two antennas, thereby improving the efficacy of the area of exchange between the two antennas. This improvement is achieved on the one hand by increasing the number of turns of the radiating antenna 10 that are available for the transfer of energy to/from the primary antenna, and on the other hand by decreasing the distance between the primary antenna and the radiating antenna.

Figure 3:
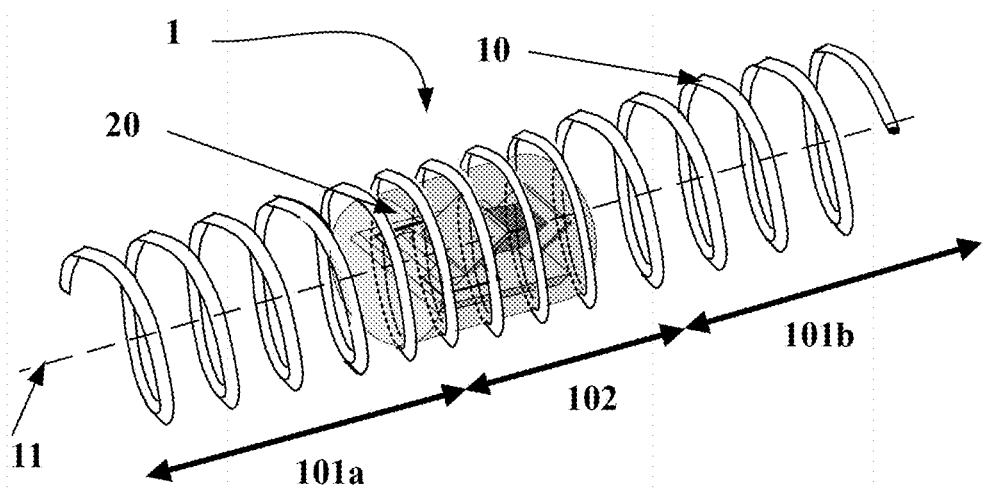
FIG. 3 is another example of a radiofrequency transponder according to the invention, having a ratio of helix pitch to winding diameter smaller than 0.8 in the central region of the radiating antenna.

FIG. 3 is another embodiment of a radiofrequency transponder 1 according to the invention, which has, with respect to the prior-art radiofrequency transponder of FIG. 1, the distinctive feature that the helix pitch of the second region 102 of the radiating antenna has been decreased by 20 percent and that, given that the winding diameter of the second region 102 has not been modified with respect to the radiofrequency transponder of FIG. 1, the ratio of the helix pitch to the winding diameter has as a result also been decreased by 20 percent and is thus below 0.8. The consequence of this modification of the ratio of helix pitch to winding diameter is that the inductance of the radiating antenna 10 at the resonant frequency is improved by 20 percent, allowing a magnetic field generated by the radiating antenna to be improved. This is the origin of an improvement in the electromagnetic coupling between the two antennas. Lastly, the area of energy transfer of the radiating antenna 10 is also increased by increasing the number of available turns of the radiating antenna 10 for a given elementary length of the primary antenna.

Figure 4:
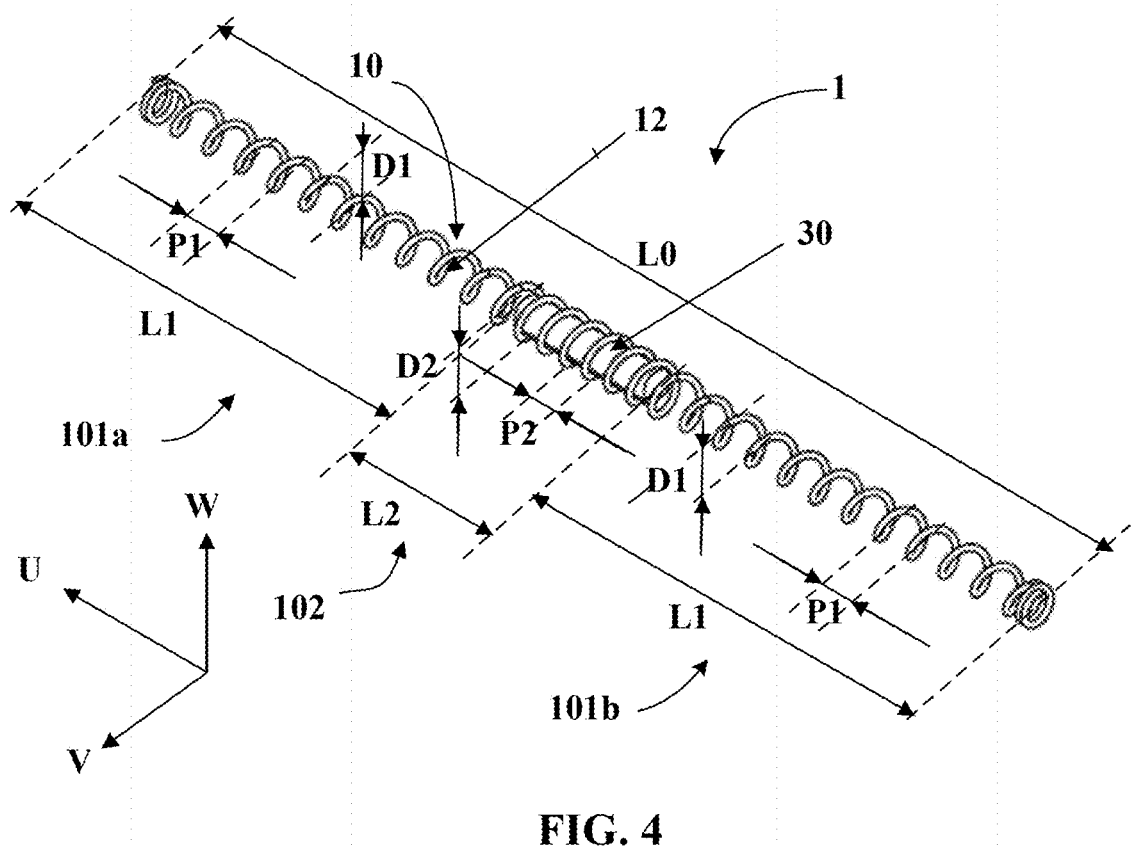
FIG. 4 is a final example of a radiofrequency transponder according to the invention, having a certain number of specificities.

FIG. 4 is an illustration of a radiofrequency transponder 1 according to the invention operating in the frequency range between 860 and 960 MHz, this transponder being intended to be incorporated into a tyre casing via an identification tag made of elastomeric material. To enhance the radiocommunication performance and the physical integrity of the radiofrequency transponder 1 within the tyre casing, it will be preferable to place the axis of revolution of the radiating antenna 10 parallel to the direction U, i.e. in a direction perpendicular to the cords of the carcass ply of the casing of a radial-ply tyre, in particular if the cords are made of metal.

The radiofrequency transponder 1 here comprises a radiating antenna 10 and an electronic portion located inside the radiating antenna 10. The electronic portion comprises an electronic chip connected to a printed circuit board. A primary antenna consists of a conductive wire comprising seventeen rectangular turns connected to the printed circuit board. The face of the printed circuit board opposite the primary antenna comprises a galvanic circuit of meander shape forming a line of 10 millimetres length and of 1 millimetre width. Lastly, the diameter of the cylinder circumscribing the primary antenna is 0.8 millimetres. Both the number of complete turns of the primary antenna and the galvanic circuit on the opposite face of the printed circuit board allow the impedance of the primary antenna to be matched to that of the circuit board.

The circuit board thus formed is embedded in a mass 30 of epoxy resin, ensuring the mechanical reliability of the electronic components and the electrical insulation of the circuit board. The cylinder circumscribing the stiff mass 30 has a diameter of 1.15 millimetres and a length of 6 millimetres.

The length L0 of the radiating antenna 10 is here 45 millimetres and corresponds to one half-wavelength of radioelectric waves at a frequency of 915 MHz in a medium of relative dielectric permittivity of about equal to 5. The radiating antenna 10 is produced using a steel wire 12 of 0.225 millimetre diameter the surface of which is coated with a layer of brass.

The radiating antenna 10 may be divided into two main regions. The first region 101 corresponds to the section of the radiating antenna that is not located plumb with the electronic portion. It comprises two sub-regions 101a and 101b flanking on either side the stiff and electrically insulating mass 30.

Each sub-region 101a, 101b has a length L1 of 19 millimetres and comprises 12 circular turns of a constant winding diameter D1 of 1.275 millimetres. This defines inside and outside diameters of 1.05 and 1.5 millimetres, respectively. The helix pitch P1 of the circular turns is of 1.55 millimetres. Thus, the ratio of the helix pitch P1 to the winding diameter D1 of the turns is 1.21. The axially outer ends of each sub-region 101a and 101b ends in 2 adjoined turns. Thus, the high ratio ensures the efficacy of the radioelectric properties of the radiating antenna 10 is maximized in this region 101. In addition, the contact between the turns located outermost on the radiating antenna 10 prevents the helical springs from becoming interlaced with one another during handling of the radiofrequency transponders. As most of the turns of the first region 101 of the radiating antenna 10 have a ratio higher than 0.8, the radioelectric performance of the radiofrequency transponder 1 is clearly improved.

In the second region 102 of the radiating antenna 10, which corresponds to the section of the radiating antenna 10 located plumb with the electronic portion, the radiating antenna 10 has a length of 7 millimetres. The helical spring has a constant helix pitch P2 of 1 millimetre and a constant winding diameter D2 of 1.575 millimetres. Thus, the inside diameter of the helical spring of the second region of the radiating antenna is 1.35 millimetres. This makes it possible to achieve a constant ratio of the pitch to the winding diameter of about 0.63. This ratio allows the inductance of the second region 102 of the radiating antenna 10 to be maximized with respect to the first region 101, this allowing the efficacy of the electromagnetic coupling to the electronic portion to be improved.

In this particular case, in the first region 101 the inside diameter of the radiating antenna 10, which is equal to 1.05 millimetres, is smaller than the diameter, equal to 1.15 millimetres, of the mass 30 as represented by the cylinder circumscribing the electronic portion. Thus, the sub-regions 101a and 101b of the first region 101 of the radiating antenna 10 form mechanical stops that limit the axial movement of the mass 30 inside the radiating antenna 10.

The electronic portion 20 is, in a first embodiment, installed by slipping the stiff and insulating mass 30 into the radiating antenna 10.

This type of installation is possible for example if one of the sub-regions 101a or 101b of the first region 101 of the radiating antenna 10 has been bent beforehand by an angle of 45 degrees to the axis of revolution of the radiating antenna 10. This bend is formed plumb with the region of transition between the first region 101 and the second region 102 of the radiating antenna 10. Thus, the opening created by this bend is sufficient for the mass 30 to be inserted into the second region 102 of the radiating antenna 10. It is enough to release the first region 101a of the radiating antenna after this insertion to obtain the radiofrequency transponder of FIG. 4.

A second way of installing the electronic portion embedded in its electrically insulating mass 30 in the radiating antenna 10 is illustrated by the overview shown in FIG. 7.

In addition, the diameter of the cylinder circumscribing the primary antenna is much larger than one third of the inside diameter of the helical spring of the second region 102 of the radiating antenna. Although the cylinder circumscribing the primary antenna is not coaxial with the axis of revolution of the radiating antenna 10, it is substantially parallel thereto. Furthermore, the minimum distance between the second region 102 of the radiating antenna 10 and the primary antenna is smaller than 0.3 millimetres, i.e. much smaller than one quarter of the inside diameter of the radiating antenna 10. This proximity of the antennas is permitted by the compressed pitch P2 in the second region 102 of the radiating antenna 10, which allows a lower tolerance to be obtained for the dimensions of the spring and in particular for the winding diameter D2. In addition, this proximity ensures better quality electromagnetic coupling between the two antennas. Of course, this electromagnetic coupling could have been improved by using turns of identical shape in the primary antenna and in the radiating antenna, circular turns for example. This coupling could also have been optimized by making the axes of the two antennas coaxial, this amounting to placing the circuit board inside the primary antenna in such a way as to minimize the axial dimension of the electronic portion. Thus, the quality of the area of transfer of electromagnetic energy between the two antennas would have been optimal.

Figure 5:
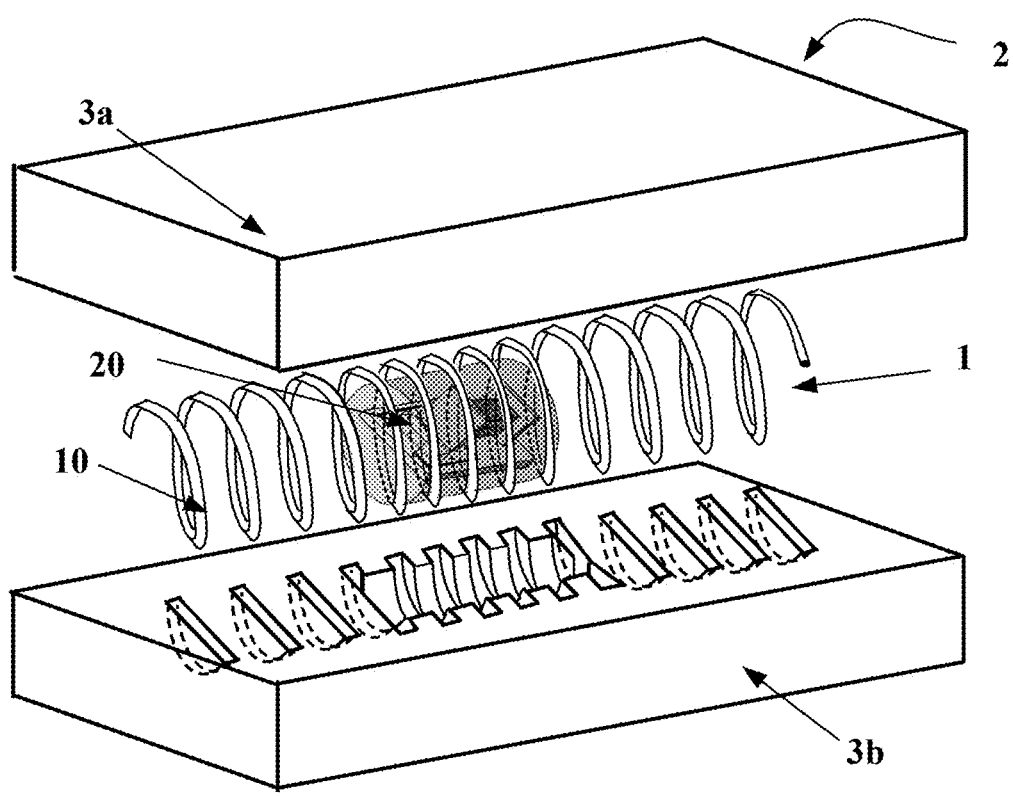
FIG. 5 is an exploded view of an identification tag.

FIG. 5 shows an identification tag 2 comprising a radiofrequency transponder 1 according to the invention embedded in a supple mass 3 made of electrically insulating elastomeric material, this mass being represented by the blocks 3a and 3b. The radiofrequency transponder 1 is generally placed in the middle of the tag 2 in order to maximize the smallest distance between the first region of the radiating antenna 10 and the external surface of the identification tag 2.

In the case where the ratio between the helix pitch and the winding diameter of the loop of the first region of the radiating antenna 10 is increased by decreasing the winding diameter of the steel wire, the volume occupied by the radiofrequency transponder 1 within the mass 3 of elastomeric materials is decreased.

This allows, in a first application, the thickness of each of the blocks 3a and 3b of the identification tag 2 to be decreased while keeping the same distance between the external surface of the identification tag 2 and the first region 101 of the radiating antenna 10. This decrease in the thickness of the identification tag 2 will facilitate its introduction into an object to be identified, while preserving the same electrical-insulation potential. In a second application, this allows the distance between the first region 101 of the radiating antenna 10 and the external surface of the identification tag 2 to be increased. This second application allows radioelectric performance to be improved and therefore the communication performance of the radiofrequency transponder 1 placed in the identification tag 2. Specifically, the electrical insulation of the tag 2 is proportional to the distance between the first region 101 of the radiating antenna 10 and the external surface of the tag 2. The radioelectric operation of the radiofrequency transponder 1 is improved, or stays the same if this distance has reached its efficacy asymptote, by a better electrical insulation of the identification tag 2.

Figure 6:
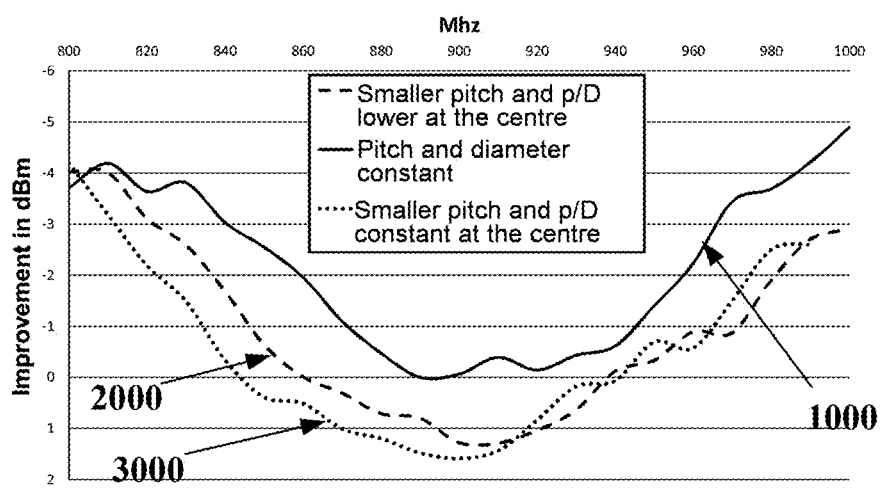
FIG. 6 shows a graph of the electrical power transmitted to three radiofrequency transponders depending on the frequency band of observation.

FIG. 6 is a graph of the electrical power transmitted by various radiofrequency transponders located inside a Michelin tyre of the XINCITY trademark and of 275/70 R22.5 dimensions to an external radiofrequency reader. The communication frequency of the radiofrequency transponders is centred on 915 MHz. The measurement protocol employed corresponds to that of standard ISO/IEC 18046-3 entitled "Identification Electromagnetic Field Threshold and Frequency Peaks". Measurements were carried out at a wide range of scanned frequencies and not at a single frequency as conventionally is the case. The x-axis represents the frequency of the communication signal. The y-axis represents the electrical power received by the radiofrequency reader expressed in decibels relative to the maximum electrical power transmitted by a current prior-art radiofrequency transponder. The continuous curve 1000 shows the response of a radiofrequency transponder as detailed in the aforementioned prior-art document. The dashed curve 2000 represents the response of a transponder according to the invention to the same signal transmitted by the radiofrequency reader. In fact, this second transponder corresponds to the transponder of FIG. 2, for which the ratio of the helix pitch to the winding diameter of the helical spring in the second region is identical to the ratio in the radiofrequency transponder of FIG. 1. The response of this second transponder highlights the efficacy of the transfer of energy between the two antennas for a radiating antenna of given electromagnetic characteristics. Lastly, the dotted curve 3000 shows the response of a transponder according to the invention to the same signal emitted by the radiofrequency reader. This third transponder has the particularity that the ratio of the helix pitch to the winding diameter of the helical spring in the second region of the radiating antenna is decreased to be lower than 0.8 as illustrated in FIG. 3. An improvement of about two decibels in favour of the radiofrequency transponders according to the invention with respect to the radiofrequency transponder mentioned in the prior art at the communication frequency of the radiofrequency reader will be noted. The minimum improvement of about one decibel is observed in a wide frequency band about the communication frequency. Between the two radiofrequency-transponder designs, the shift in the resonant frequency is more notable than the improvement in the entire band of either of the designs.

FIG. 7 is an overview of a process for manufacturing an identification tag 2 according to the invention To obtain the identification tag 2, first a radiofrequency transponder 1 according to the invention must be manufactured. The various sequential steps of the manufacture of the radiofrequency transponder 1, then those of the identification tag 2, are identified. Steps associated with the art of telecommunications or electronics are clearly differentiated from those of the assembly, such as for example the installation in a tyre casing, which may be carried out by the tyre manufacturer.

With reference to FIG. 7, which shows an overview of manufacture of an identification tag 2, it may be seen that the manufacturing process comprises three independent and successive phases.

In a first phase, the electronic portion 20 of the radiofrequency transponder 1, which will interrogate the electronic chip 22 and send the response to the radiating antenna 10 is produced. The transmission of information between the radiating antenna 10 and the electronic portion 20 is achieved by electromagnetic coupling using a primary antenna.

This electronic device, which is encapsulated in the stiff mass 30, is composed on the one hand of an electronic chip and on the other hand of a primary antenna.

The electronic portion 20 is intended to be located inside the radiating antenna 10. In one preferred embodiment, a lead-frame process is employed to form the electro-mechanical carrier of the primary antenna and of the electronic chip, the lead frame forming the equivalent of a printed circuit board. This process is particularly well suited to this configuration because it lends itself well to miniaturization.

The first step consists in forming the circuit board. To do this, the electronic chip is firstly fastened to the lead frame using a conductive adhesive, for example the adhesive H20E from Tedella. Next, the chip is connected by wire bonding, i.e. an electrical bridge is produced between the electronic chip and the printed circuit board that the lead frame may be said to represent using, for example, gold wires of 20-micron diameter. It is then possible to measure the electrical impedance of the circuit board at the points at which the primary antenna is fastened to the lead frame using a suitable electrical device such as an impedance meter.

The second step consists in producing the primary antenna. In a first embodiment, this antenna will be formed from a coil of circular turns that is constructed directly on the lead frame in wire-bonding technology. In another variant, the primary antenna will be formed by creating an antenna using two segments of copper wire that are connected to the circuit board by means of a metal soldering technology used in the electronics industry, and that are oriented in opposite directions to form a dipole antenna. To construct a coil of a number of turns, a gold wire of 20-micron diameter is employed, though aluminium or palladium-coated copper wire could also have been used, to produce the half-turns of the coil on the back side of the lead frame. The diameter of each of these half-turns is 400 microns, and the ultrasound technology conventionally used in the semiconductor industry is used to electrically connect the gold wires and the lead frame. Next, on the front side of the lead frame, the other half-turns are produced in order to obtain a cylindrical coil of 15 turns of 400-micron diameter.

The number of turns of the primary antenna is defined such that the electrical impedance of the primary antenna is matched to the electrical impedance of the circuit board, which comprises at least the printed circuit board that the lead frame may be said to represent and the electronic chip. In our case, the electrical impedance of the electronic chip alone is a complex number that has, for example, a value of (10–j*150) ohms. Thus, a coil of 15 turns of 400-micron diameter corresponds to a good match to the electrical impedance of the circuit board constructed with a copper lead frame.

The last step of production of the electronic portion 20 consists in encapsulating the printed circuit board and the components that are connected thereto and the primary antenna in a stiff mass 30, using a high-temperature epoxy resin. To do this, the globtop technology well known to those skilled in the art is used. The stiff mass 30 forms a capsule that protects the circuit board of the radiofrequency transponder 1.

In another embodiment of the electronic device, intended to be placed inside the radiating antenna 10, production of the primary antenna using a copper wire of 180 microns coated with an electrically insulating thermoplastic sheath is started with first. This wire is wound around a stiff and electrically insulating tubular core in such a way as to produce a coil of about ten turns of outside diameter of 1 millimetre with a helix pitch of 0.2 millimetres and ending with two uncoated ends. It is then possible to evaluate the actual peripheral area s of the primary antenna using the diameter of the copper wire, the outside diameter of the antenna, the helix pitch and the total number of turns. In this case, the radius of the helical surface is 500 microns since the primary antenna is located inside the radiating antenna 10.

The circuit board is produced using a flexible carrier. In a first variant, the electronic chip is fastened using a conductive adhesive of ACP type (ACP being the acronym of Anisotropic Conductive Paste) not requiring electrical cabling between the chip and the circuit board. In a second variant, the electronic chip is fastened using a non-conductive adhesive for mounting electronic components. The connection of the chip to the circuit board is achieved by wire bonding, i.e. an electrical bridge is produced between the electronic chip and the flexible carrier that the printed circuit board may be said to represent using, for example, gold wires of 20-micron diameter.

Next, the two uncoated ends of the primary antenna are connected to the printed circuit board using a conductive adhesive, for example the adhesive H20E of the Tedella brand.

Lastly, the circuit board and the uncoated endings of the primary antenna are covered with a stiff and electrically insulating material such as high-temperature epoxy resin using the globtop technique, which is well known to those skilled in the art.

In a second phase, corresponding to the art of telecommunications, the radiating antenna, which will ensure the transmission and reception of electromagnetic waves to and from the radiofrequency reader, is formed.

According to a first specific embodiment, production of the radiating antenna is combined with assembly of the same antenna with the electronic portion produced in the first phase, in order to facilitate insertion of this electronic portion into the radiating antenna.

Thus, first a primary portion of the radiating antenna is produced using a spring-winding machine, which delivers a steel wire of outside diameter of 150 microns that is plastically deformed by an imposed movement. Of course, the machine may be automated in order to modify the applied deformation to modify the winding diameter and the helix pitch of each loop of the helical spring during its manufacture. This primary portion of the radiating antenna necessarily comprises the first sub-region of the first region of the radiating antenna and almost all of the second region of the radiating antenna, which will have a larger winding diameter. Furthermore, optionally, the helix pitch of the loops of this second region is different from that of the loops of the first region of the helical spring.

After this first step, the manufacture of the helical spring is stopped in order to install the electronic portion produced in the first phase inside the primary portion of the produced radiating antenna. This operation is performed in the spring-winding machine itself.

It firstly requires stresses in the formed helical spring to be relaxed by freeing one of the ends of the helical spring. This has the effect of decreasing pre-stresses in the helical spring, leading the winding diameter of the produced spring to increase. Next, the electronic portion is installed in this primary portion of the relaxed helical spring using a pistol, which is positioned in place of the finger for deforming the steel wire. The change of tool is achieved using the rotation of a spindle the angular ends of which are on the one hand the pistol and on the other hand the finger for deforming the steel wire.

The installation consists, for example, in bringing one of the axial ends of the electronic portion into abutment against a loop of the primary portion of the radiating antenna while ensuring a parallelism or even a coaxiality between the axis of revolution of the primary portion of the radiating antenna and the axis of revolution of the electronic portion. In addition, the axial positioning of the electronic portion within the primary portion of the radiating antenna must allow the median plane of the primary antenna of the electronic portion to be substantially centred with respect to the final radiating antenna.

The installation is performed using a pistol providing mechanical propulsion. However, any other type of propulsion: magnetic, pneumatic, hydraulic or a combination thereof, is envisageable. Next, the deforming finger is returned to position, the electronic portion being maintained in position using the second region of the radiating antenna, which region has already been produced.

Lastly, the third step consists in restarting the formation of the helical spring from where it was stopped at the end of the first step with the presence of the electronic portion. After the electronic portion has been freed from its gripping and positioning means and they have been removed from the region of production of the helical spring, the second sub-region of the primary portion of the radiating antenna is produced. The steel wire is then cut when the length of the helical spring has reached the desired length L0.

According to a second embodiment of the radiofrequency transponder, which embodiment is not illustrated in FIG. 7, a radiating antenna taking the form of a single-strand helical spring comprising a second region in which the electronic portion will be placed is first produced. This second region has a winding diameter D2 and a helix pitch P2. The helical spring also comprises two segments of a first region of the radiating antenna, which are located at each end of the second region. This first region is defined by helices have a winding diameter D1 and a helix pitch P1. This type of helical spring is conventionally manufactured on a standard winding machine with duration-optimized manufacturing cycles.

Next comes the step of assembling the electronic portion produced in the first phase with the radiating antenna formed in the preceding step.

Initially, it is necessary to locate, on the helical spring produced in the preceding step, a region of transition that generally comprises a turn between the second region and one segment of the first region of the radiating antenna.

Passage from the first region to the second region is perceptible from the variation in the winding diameter of the wire, which variation is potentially accompanied by a variation in the helix pitch. To locate this region of transition, it is recommended to employ, for example, a camera that is able to focus on a few turns of the helical spring. Ideally, one end of the helical spring is presented and the helical spring is moved along its axis of revolution U in front of the field of the camera. An image-processing software package or the human eye allows the winding diameter of the spring to be observed to be the diameter of the cylinder circumscribing the helical spring of axis of revolution U. The variation in the diameter of the cylinder corresponding to the region of transition between two regions in which the winding diameter is constant is thus observed.

Next, the last turn of the region of transition, which makes contact with the second region of the helical spring, in which the winding diameter is D2, is located. To do this, the helical spring is again moved along the axis of revolution U in front of the field of the camera with successive back-and-forth movements.

With respect to a straight bending line of the spring, which is defined in the machine on which the helical spring is mounted, it is recommended to position a radially outer end of the last turn of the region of transition on the straight bending line. To do this, it is also recommended to move the helical spring in a direction along the axis of revolution U of the spring. Potentially it will be necessary to move the spring transversely to ensure that the bending region lies tangent to the cylinder circumscribing the helical spring in the region of transition. Lastly, it is then necessary to pivot the spring about its axis of revolution U to a position in which one end of the last turn is located on the straight bending line. The position of the helical spring is then blocked rotationally and movementwise.

The cycle of the machine is started, which causes the segment of the first region of the helical spring to be bent with respect to the rest of the helical spring about the straight bending line, which is perpendicular to the axis of revolution U. This bending by an angle, conventionally 90° in our applications in which the diameter of the cylinder circumscribing the electronic portion is close to the inside diameter of the second region of the radiating antenna, allows an opening to be generated in the end of the second region of the helical spring. The inscribed diameter of this opening is larger than or equal to the diameter of the cylinder circumscribing the electronic portion, allowing the electronic portion to be easily inserted.

The electronic portion is inserted into the second region of the radiating antenna via the aperture. The axial end of the electronic portion along the main axis of the cylinder circumscribing the electronic portion must be located at a distance smaller than the helix pitch from the second region of the helical spring above a particular plane. This plane, the normal of which is the axis of revolution of the portion of the helical spring that is blocked in the machine, passes through the bending point; Thus, the electronic portion, once inserted into the second region of the radiating antenna, does not hinder bending of the segment of the first region of the radiating antenna. Ideally, the electronic portion is entirely below the orthogonal plane.

The helical spring is bent again at the bending point by a second angle opposite to the first angle about the axis perpendicular to the axis of revolution of the portion of the helical spring that is blocked in the machine. The amplitude of this angle is here about 105 degrees for a wire made of mild steel of 0.225 mm diameter. The amplitude is at least equal to or larger than the amplitude of the first angle. The axes of revolution of the blocked portion of the helical spring and of the free portion of the helical spring are then collinear. In this case, the first bend of the segment of the first region causes a localized increase in the plasticity of the steel at the bending point. To ensure that the final spring has an axis of revolution of straight shape, it is recommended to increase the plasticity of the region around the bending point during the second bend as this leads to an increase in the second bending angle.

The radiating antenna thus formed, equipped with its electronic portion perfectly positioned inside, represents the radiofrequency transponder according to the invention. Optionally, the electronic portion is inserted into the second region of the helical spring in such a way as to bring the second axial end of the electronic portion into abutment with a turn of the second region of transition between the first and second regions of the helical spring. This abutment ensures not only that the electronic portion is axially positioned within the helical spring but also a coaxiality of the primary antenna of the electronic portion with the helical spring.

The last phase, once the radiofrequency transponder 1 has been produced, is to obtain an identification tag 2 in order to facilitate use of the radiofrequency transponder 1 in objects to be identified partially consisting of elastomer blends. This phase proceeds as follows.

The radiofrequency transponder 1 formed in the preceding phase is placed at the centre of a supple mass 3. As for example illustrated in FIG. 5, the radiofrequency transponder 1 is sandwiched between two blocks 3a and 3b made of green elastomeric material of dimensions depending on those of the radiofrequency transponder 1 and of a thickness comprised for example between 2 and 5 millimetres. The longitudinal direction of the blocks corresponds to the axis of the radiating antenna 10. The assembly is placed beforehand on the internal face of a metal die of a pressing tool of size tailored to the volume of the elastomer mass.

Using a metal punch complementary to the die, a compressive force is applied, by means of a pressing tool, for example a pneumatic uniaxial press, to the assembly in order to form a compact geometry having an axis of symmetry, of length for example of 60 millimetres, inscribed in a cylinder of diameter of about 20 millimetres corresponding to an identification tag 2 of the radiofrequency transponder 1 according to the invention.

Other processes may be employed to incorporate the radiofrequency transponder 1 within a mass of one or more elastomer blends such as for example an extrusion or injection-moulding process.

In one particular embodiment, adhesion promoters well known to those skilled in the art are employed to promote adhesion between the stiff mass 30 made of high-temperature epoxy resin encapsulating the electronic portion 20 of the radiofrequency transponder 1 and the elastomer blend of the identification tag 2. This may improve the endurance of the radiofrequency transponder in service.

Finally, a radiofrequency transponder 1 according to the invention may be industrially implemented, in an object to be identified such as a pneumatic tyre, according to at least two embodiments. In a first preferred embodiment, it is enough to incorporate the radiofrequency transponder 1 or the identification tag 2 in a green elastomer blend into an unfinished tyre during the production of the pneumatic tyre. The transponder or the identification tag 2 is placed between the various elastomer components of the green unfinished pneumatic tyre. Ideally, it is placed in a spatial region of the tyre that undergoes acceptable levels of deformation so that the radiating antenna 10 is not plastically deformed. The unfinished tyre undergoes the various phases of manufacture of the tyre, including the oven bake that vulcanizes the various elastomer blends and that causes the transponder or identification tag to become an integral part of the pneumatic tyre thus produced. The radiofrequency transponder 1 is then ready for use.

Another preferred embodiment consists in setting the elastomer structure of the identification tag 2 by cross-linking or vulcanization in a step subsequent to the manufacture of the identification patch 2. The device obtained following this operation is fastened to an accommodating region of the pneumatic tyre using a conventional elastomer/elastomer bonding technique known to those skilled in the art, such as adhesion achieved by cold cross-linking a layer of bonding rubber to the interior rubber of the pneumatic tyre for example. The radiofrequency transponder 1 of the tyre is then ready for use.

Figure 8:
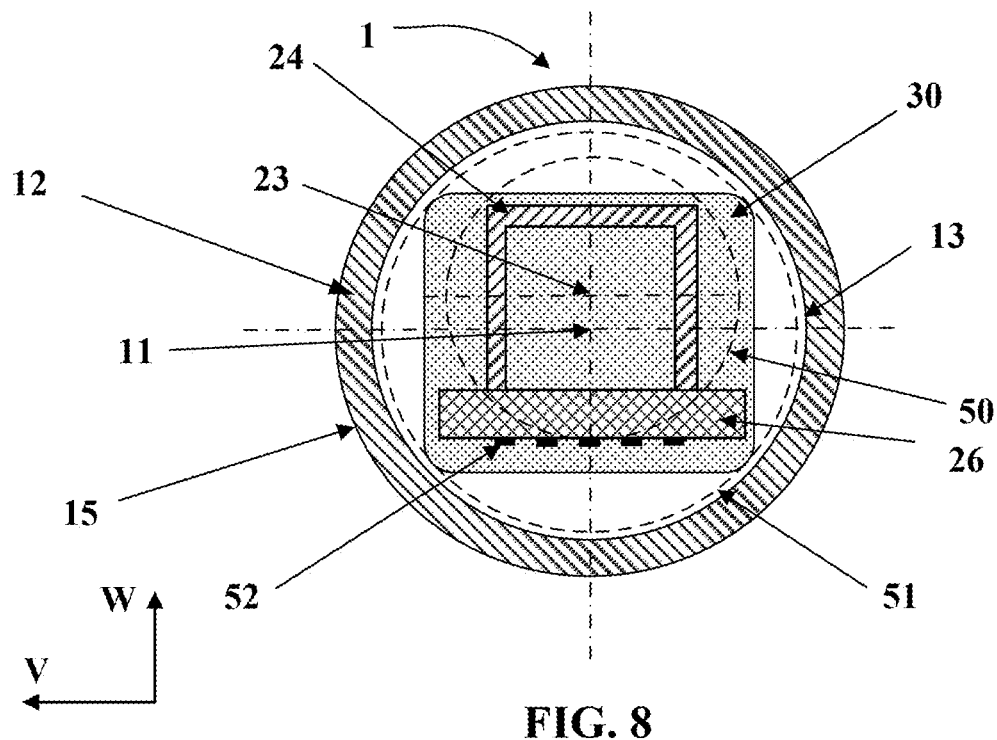
FIGS. 8 and 9 are cross-sectional views of the second region of the radiating antenna of the radiofrequency transponder according to the invention, for different designs of the electronic portion.

FIG. 8 is a transverse cross-sectional view of the second region of the radiating antenna when the electronic portion, embedded in a stiff mass 30 circumscribed by a cylinder 51, is placed inside the radiating antenna to form a passive radiofrequency transponder 1 according to the invention. The radiating antenna consists of a helical spring produced using a steel wire 12 of 0.20 millimetres diameter wound with a variable winding diameter defining an inside diameter 13 and an outside diameter 15 of the radiating antenna.

The electronic portion comprises, in this first design, a printed circuit board 26 to which an electronic chip is electrically and mechanically connected. On the upper face of the printed circuit board 26 in the direction W of the radiofrequency transponder 1 is positioned a primary antenna 24. This primary antenna 24 here takes the form of a coil consisting of 16 rectangular turns one of the sides of which consists of a galvanic track produced on the upper face of the printed circuit board 26. These turns are whole and the free ends of the primary antenna 24 are galvanically connected to the electronic chip of the circuit board. The primary antenna 24 is inscribed in a cylinder 50 the axis of revolution 23 of which is parallel to the axis of revolution 11 of the radiating antenna. The diameter of this cylinder 50 is larger than one third of the inside diameter 13 of the radiating antenna, ensuring electromagnetic coupling between the two antennas.

The lower face of the printed circuit board 26 in the direction W of the radiofrequency transponder 1 comprises an additional circuit board 52 taking the form of a galvanic track of meander shape the ends of which are connected to the circuit board using bridges (not shown) ensuring the electrical connection between the lower and upper faces of the printed circuit board 26. This galvanic circuit made of copper of length of 10 millimetres and of width of 1 millimetre allows the electrical impedance of the circuit board to be matched to that of the primary antenna 24, in order to optimize the exchange of energy within the electronic portion.

Lastly, the electronic portion is encapsulated in a stiff and electrically insulating mass 30 of high-temperature epoxy resin that protects the components and the mechanical and electrical connections of the circuit board and the primary antenna 24. This mass 30 has a parallelepipedal, here rectangular, shape in order to decrease the amount of material used with the aim of optimizing the technical-economical ratio of the electronic portion. This mass 30 is inscribed in a cylinder 51 the axis of revolution of which is here coaxial to the axis of revolution 11 of the radiating antenna. In order to minimize the diameter of this cylinder and facilitate the insertion of the mass 30 including the electronic portion into the radiating antenna, the edges of the parallelepiped are rounded. This makes it possible to ensure the integrity of the mass 30, and therefore of the electronic portion, and of the radiating antenna by increasing the area potentially in contact between the two structures.

The rounding of the encapsulating mass 30 may be achieved simply via a vibratory finishing process. Following the process for manufacturing the electronic portion, the electronic insulation of the electronic portion by the epoxy resin may employ processes such as moulding. These processes generate an embedding mass 30 with a parallelepipedal outline and sharp edges. Of course, the encapsulating mass 30 may contain, on its external surface not only electrical insulation materials such as epoxy resin but also the material of the circuit board, which is by nature an electrical insulator. The vibratory finishing process then consists in mixing these potentially bi-material parallelepipedal objects with objects of stiff type, i.e. objects that are not deformable with respect to the encapsulating mass 30, and of rounded shape, such as beads and/or cylinders, in order to round the edges of the parallelepiped. These objects are here referred to as rounding agents. Rounding agents that are extremely mechanically resistant and generally made of ceramic are used to this end. The process consists in mixing the parallelepipedal encapsulating masses 30 containing the electronic portions with stiffer rounding agents in the presence of a lubricating liquid such as for example soapy water. The lubricating liquid thus limits the choice between the various objects able to generate the initiation and the propagation of cracks in the encapsulating masses that it is sought to round. The vibratory finishing process consists in mixing the lubricating liquid composition, the encapsulating mass 30 of parallelepipedal shape of sharp edges comprising epoxy resin or the printed circuit board and resistant rounding agents, which are of rounded shape and stiffer than the encapsulating masses so as to facilitate the rubbing of the rounding agents against the encapsulating masses. The rubbing has no detrimental effect on the planar and continuous regions of the encapsulating mass. In contrast, it will gradually wear away the discontinuous regions of the encapsulating mass, i.e. the corners of the parallelepiped. The mixing is for example achieved by spinning the composition in a seal-tight drum for a sufficient length of time to generate radii of curvature at the corners of the encapsulating mass 30 of about 0.2 to 0.5 millimetres. The radius of curvature obtained is necessarily dependent on the material to be rounded: it may differ over an encapsulating mass the external surface of which consists of materials of different stiffness. For example, spinning for one to two hours at a speed of rotation of about 1 to 5 revolutions per second allows the desired rounded parallelepipeds to be obtained.

In order to facilitate separation of the various components of the composition, it is also preferable for the size of the various components to be different. For example, it is desirable for the characteristic dimension of the rounding agents to be larger than those of the encapsulating masses 30. Thus, the use of a sieve the size of the perforations of which is chosen on the one hand to let one category of components, such as the encapsulating masses 30 and the lubricating liquid, pass and on the hand to retain the second category of components, such as the rounding agents, allows the various components of the composition to be rapidly separated.

Lastly, the distance between the primary antenna 24 and the inside diameter 13 of the radiating antenna is here smaller than 15 percent of the inside diameter 13 of the radiating antenna. This minimum distance is at least obtained at one geometric point or even two geometric points in the case of parallelism of the axes of the antennas. This proximity optimizes the efficacy of the transfer of energy between the primary antenna 24 and the radiating antenna.

Figure 9:
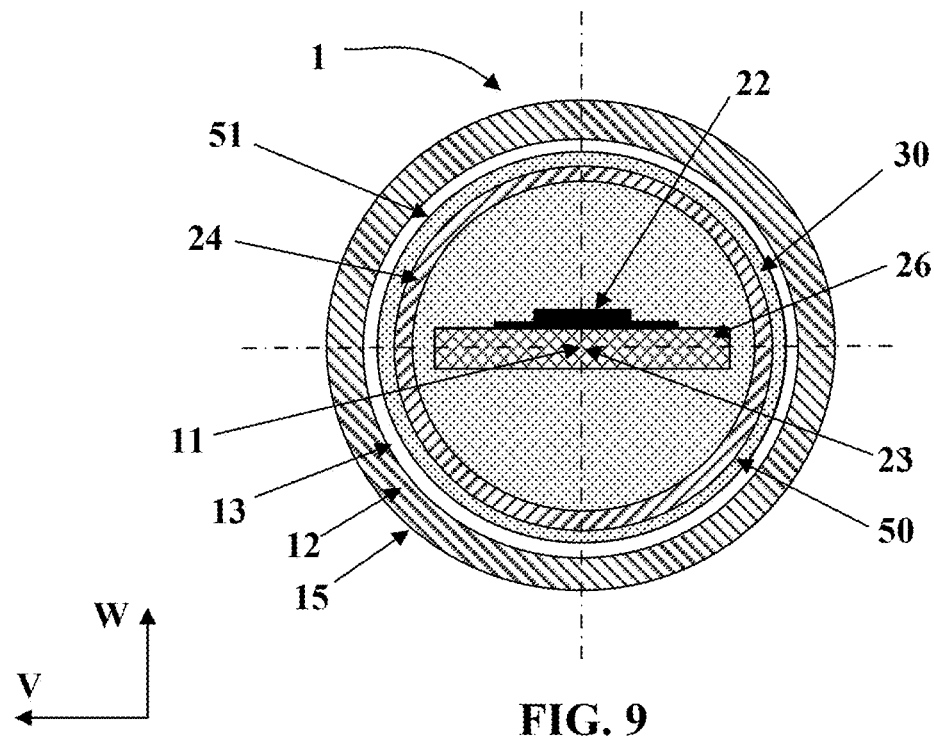

FIG. 9 is a transverse cross-sectional view of the second region of the radiating antenna when the electronic portion, embedded in a stiff mass 30 circumscribed by a cylinder 51, is placed inside the radiating antenna to form a passive radiofrequency transponder 1 according to the invention. However, the electronic portion is here of another design. The radiating antenna consists of a helical spring produced using a steel wire 12 of 0.18 millimetres diameter wound with a variable winding diameter defining an inside diameter 13 and an outside diameter 15 of the radiating antenna.

The electronic portion comprises, in this second design, a printed circuit board 26 to the upper (in the direction W of the radiofrequency transponder 1) face of which printed circuit board 26 is electrically and mechanically connected an electronic chip 22. This printed circuit board 26 is electrically connected to the free ends of a primary antenna 24. This primary antenna 24 here takes the form of a coil consisting of turns of circular shape. The primary antenna 24 is inscribed in a cylinder 50 the axis of revolution 23 of which is parallel, here even coaxial, to the axis of revolution 11 of the radiating antenna. The diameter of this cylinder 50 is larger than one third of the inside diameter 13 of the radiating antenna, ensuring electromagnetic coupling between the two antennas. In fact, the diameter of this cylinder 50 corresponds in this case to 90 percent of the inside diameter 13 of the radiating antenna. The proximity of the two antennas ensures an excellent electromagnetic coupling by optimizing the area guaranteeing the transfer of energy between the two antennas. This coupling would be optimum if the axis of the cylinder 50 and the axis of revolution 11 of the radiating antenna were coaxial.

The printed circuit board 26 is located inside the primary antenna 24 in order to limit the total length of the electronic portion. The number of turns is here a non-integer number, the incomplete turn serving as an additional electronic circuit for matching the electrical impedance of the primary antenna 24 to that of the circuit board.

In our example, the electronic portion is encapsulated in a stiff and electrically insulating mass 30 of high-temperature epoxy resin taking the form of a cylinder 51 the diameter of which is slightly larger than the diameter of the circle 50 circumscribing the electronic portion. This stiff and electrically insulating mass 30 protects the electronic components and the electrical connections between components. The cylindrical shape of this protective mass 30 ensures that the electronic portion and the radiating antenna retain mechanical integrity by preventing point contacts between the two structures, such point contacts being sources of concentrations of thermomechanical stresses. The proximity of the two structures is here propitious to contact.

The invention claimed is:

1. A passive radiofrequency transponder, intended to be integrated into an elastomer blend mass, comprising:
    a radiating dipole antenna consisting of a single-strand helical spring having an axis of revolution, a median plane, a winding diameter, a helix pitch, and a wire diameter defining inside and outside diameters of the radiating dipole antenna, the length of which is suitable for communication in a frequency band with a radiofrequency-transmitting reader; and
    an electronic portion located inside the radiating dipole antenna, the electronic portion comprising an electronic chip and a primary antenna electrically connected to the electronic chip and electromagnetically coupled to the radiating dipole antenna, the primary antenna having an axis substantially parallel to the axis of revolution of the radiating dipole antenna, the primary antenna having a median plane which is substantially superposed with the median plane of the radiating dipole antenna, and the primary antenna being circumscribed by a cylinder, the axis of revolution of which is parallel to the axis of the primary antenna and the diameter of which is larger than or equal to one third of the inside diameter of the radiating dipole antenna, located plumb with the radiating dipole antenna,
    wherein, in a first region of the radiating dipole antenna in which the radiating dipole antenna is not located plumb with the electronic portion, a first pitch of the radiating dipole antenna corresponding to the helix pitch of the radiating dipole antenna in the first region is larger than a second pitch of the radiating dipole antenna corresponding to the helix pitch of the radiating dipole antenna in a region in which the radiating dipole antenna is located plumb with the electronic portion.

2. The radiofrequency transponder according to claim 1, wherein the second helix pitch of the radiating dipole antenna is constant.

3. The radiofrequency transponder according to claim 1, wherein the second helix pitch of the radiating dipole antenna is variable.

4. The radiofrequency transponder according to claim 1, wherein a minimum distance between the cylinder circumscribed about the primary antenna and the radiating dipole antenna is smaller than 15% of half the inside diameter of the radiating dipole antenna.

5. The radiofrequency transponder according to claim 1, wherein the axis of the cylinder circumscribed about the primary antenna is parallel to the axis of revolution of the radiating dipole antenna.

6. The radiofrequency transponder according to claim 5, wherein the diameter of the cylinder circumscribed about the primary antenna is larger than 75% of the inside diameter of the radiating dipole antenna.

7. The radiofrequency transponder according to claim 1, wherein the primary antenna is connected to terminals of a circuit board comprising the electronic chip, and electrical impedance of the primary antenna is matched to electrical impedance of the circuit board.

8. The radiofrequency transponder according to claim 7, wherein the primary antenna is a coil consisting of turns, and the number of turns is a real number between 5 and 30.

9. The radiofrequency transponder according to claim 8, wherein the impedance of the primary antenna is matched using at least one additional electronic circuit positioned on the circuit board.

10. The radiofrequency transponder according to claim 9, wherein the at least one additional electronic circuit is a galvanic circuit of meander shape.

11. The radiofrequency transponder according to claim 1, wherein a ratio between the helix pitch and the winding diameter for at least one loop of the radiating dipole antenna located in the first region of the radiating dipole antenna is higher than 0.8.

12. The radiofrequency transponder according to claim 1, wherein, in a second region of the radiating dipole antenna in which the radiating dipole antenna is located plumb with the electronic portion, a ratio between the helix pitch and the winding diameter for each loop of the radiating dipole antenna is lower than or equal to 0.8.

13. The radiofrequency transponder according to claim 1, wherein a first inside diameter of the radiating dipole antenna corresponding to the inside diameter of the radiating dipole antenna in the first region is smaller than a second inside diameter of the radiating dipole antenna corresponding to the inside diameter of the radiating dipole antenna in a second region different from the first region, and the electronic portion is circumscribed by a cylinder the axis of revolution of which is parallel to the axis of revolution of the radiating dipole antenna and the diameter of which is larger than or equal to the first inside diameter of the radiating dipole antenna.

14. The radiofrequency transponder according to claim 1, wherein communication with the radiofrequency-transmitting reader occurs in the UHF band.

15. The radiofrequency transponder according to claim 1, wherein the winding diameter of the radiating dipole antenna in the first region is between 0.6 and 2.0 millimeters.

16. The radiofrequency transponder according to claim 1, wherein the winding diameter of the radiating dipole antenna in the second region is between 1.4 and 2.0 millimeters.

17. The radiofrequency transponder according to claim 1, wherein the helix pitch of at least one loop of the radiating dipole antenna in the first region of the radiating dipole antenna is between 1 and 4 millimeters.

18. The radiofrequency transponder according to claim 1, wherein the helix pitch of the radiating dipole antenna in the second region of the radiating dipole antenna is smaller than 1.5 millimeters.

19. An identification tag comprising a radiofrequency transponder according to claim 1, wherein the radiofrequency transponder is embedded in at least one supple and electrically insulating elastomer blend.

* * * * *